Patented Dec. 8, 1936

2,063,590

UNITED STATES PATENT OFFICE 2,063,590

NAPHTHOIC ACID XYLIDIDES AND THEIR PRODUCTION

Miles Augustinus Dahlen, Wilmington, Del., and Martin Edwin Friedrich, Carneys Point, N. J., assignors to E. I. du Pont de Nemours & Company, Wilmington, Del., a corporation of Delaware No Drawing. Application July 23, 1935, Serial No. 32,722

15 Claims. (Cl. 260—124)

A. This invention relates to new compositions of matter, to new intermediates for azo colors, and to processes of preparing them.

B. An object of the invention is to make new intermediates useful in the manufacture of azo colors. Another object of the invention is to employ the new intermediates in the manufacture of azo colors. Another object of the invention is to present new compositions of matter and processes of making them which are both economically and technically satisfactory. Other objects of the invention will be obvious or elsewhere herein set forth.

C. The objects of the invention are accomplished, generally speaking, by preparing the sym-xylidides of 2,3-hydroxy-naphthoic acid. The new compounds have the formula:

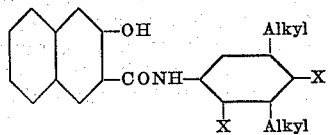

in which X is hydrogen or halogen.

D. In the preferred form of practicing the invention the new compounds are made by suspending 2,3-hydroxy-naphthoic acid in an inert solvent, adding the arylamine, and thereafter admixing a dehydrating agent. Exemplary of satisfactory inert solvents are toluene or chlorobenzene, solvents which are satisfactory from the point of stability, availability and price. Other inert solvents may also be used. Exemplary of satisfactory dehydrating agents are phosphorus-trichloride or thionyl-chloride. There may also be used any of the well-known methods of producing the arylamides of 2,3-hydroxy-naphthoic acid.

E. Exemplary of the class of arylamines which find utility in the preparation of new arylamides of 2,3-hydroxy-naphthoic acid are:

4-brom-3,5-dimethyl-aniline
2,4-dichloro-3,5-dimethyl-aniline
3,5-diethyl-aniline
3,5-dibutyl-aniline
4-iodo-3,5-dimethyl-aniline
4-fluoro-3,5-dimethyl-aniline.

F. The following examples, in which parts are by weight, illustrate but do not limit the invention.

Example I

A symmetrical xylidide of 2,3-hydroxy-naphthoic-acid was prepared as follows: 40 parts of 2,3-hydroxy-naphthoic-acid, 433 parts of toluene, and 25 parts of 3,5-dimethyl-aniline were heated to 50° C. and 13.0 parts of phosphorustrichloride were added. The mixture was refluxed and agitated for 18 hours. The charge was made alkaline by soda ash. The toluene was removed by direct and steam distillation and the 3,5-dimethyl-anilide of 2,3-hydroxy-naphthoicacid was isolated by filtration, dried, and ground. The product was a white powder. The yield was 90% of theory.

Example II

*1- (2',3'-hydroxy-naphthoyl-amino) -2-chlor-3,5-dimethyl-benzene*

14.0 parts of 2,3-hydroxy-naphthoic-acid and 10 parts of 2-chlor-3,5-dimethyl-aniline (M. P. 28–29° C.) were added to 250 parts of toluene. The mixture was agitated and warmed to 50° C. and 3.5 parts of phosphorus-trichloride were added. The charge was refluxed for 15 hours, cooled to 60° C., and soda ash added to neutralize the acidity. The toluene was removed by steam distillation, and the precipitate isolated by filtration. On washing and drying the product, 17 parts of a white powder were obtained. The material had the probable constitution:

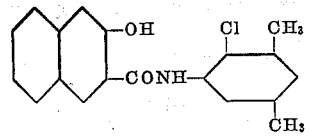

Example III

*1 - (2',3' - hydroxy - naphthoyl - amino) - 3,5 - dimethyl-4-chlor-benzene*

11.0 parts of 2,3-hydroxy-naphthoic-acid were added to a mixture of 175 parts of toluene and 10 parts of the hydrochloride of 4-chlor-3,5-dimethyl-aniline. The charge was warmed to 50° C. and 3.5 parts of phosphorus-trichloride added slowly, with agitation. It was refluxed for 15 hours, then the toluene solution decanted from the oily layer adhering to the flask. The solution was cooled, filtered, and the precipitate washed well with alcohol and dried. 12 parts of a white powder were obtained. The material had the probable structure:

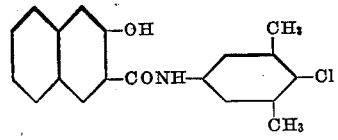

G. The new compounds are useful in the manufacture of azo colors, as described and claimed in our copending application Serial No. 1,316, filed January 11, 1935, of which this application is a continuation in part.

H. As many apparently widely different embodiments of this invention may be made without departing from the spirit and scope thereof, it is to be understood that we do not limit ourselves to the specific embodiments thereof except as defined in the appended claims.

We claim:

1. The compound represented by the formula:

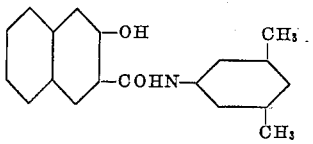

in which the xylidino radical is halogenated.

2. The compound represented by the formula:

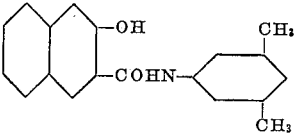

in which the xylidino radical is halogenated ortho to the imino group.

3. The compound represented by the formula:

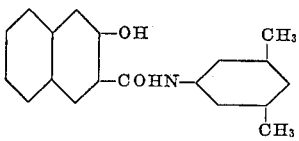

in which the xylidino radical is halogenated para to the imino group.

4. The compound represented by the formula:

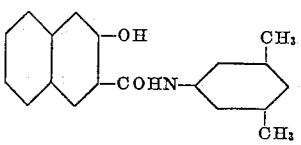

in which the xylidino radical is chlorinated.

5. The compound represented by the formula:

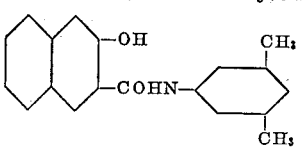

in which the xylidino radical is brominated.

6. The compound represented by the formula:

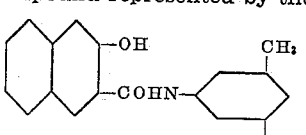

in which the xylidino radical is chlorinated ortho to the imino group.

7. The compound represented by the formula:

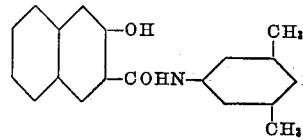

in which the xylidino radical is halogenated para to the imino group.

8. The process which comprises reacting 2,3-hydroxy-naphthoic-acid with halogenated 3,5-dialkyl-aniline in the presence of a dehydrating agent, alkyl being saturated and of the formula $C_nH_{2n+1}$.

9. The process which comprises reacting 2,3-hydroxy-naphthoic-acid with chlorinated 3,5-dialkyl-aniline in the presence of a dehydrating agent, alkyl being saturated and of the formula $C_nH_{2n+1}$.

10. The process which comprises reacting 2,3-hydroxy-naphthoic-acid with brominated 3,5-dialkyl-aniline in the presence of a dehydrating agent in an inert solvent, alkyl being saturated and of the formula $C_nH_{2n+1}$.

11. A process which comprises heating to 50° C. a mixture of 40 parts of 2,3-hydroxy-naphthoic-acid, 433 parts of toluene, and 25 parts of 3,5-dimethyl-aniline in the presence of 13 parts of phosphorus-trichloride, refluxing with agitation for about 18 hours, basifying with soda ash, removing the toluene by distillation, filtering, drying, and grinding the product.

12. The method which comprises heating at about 50° C. a solution in an inert solvent of 2,3-hydroxy-naphthoic-acid and 3,5-dimethyl-aniline in the presence of phosphorus-trichloride, basifying, and isolating the reaction product.

13. A process which comprises reacting 2,3-hydroxy-naphthoic acid with 3,5-dialkyl-aniline in the presence of a dehydrating agent in an inert solvent, alkyl being saturated and of the formula $C_nH_{2n+1}$.

14. The compound represented by the formula:

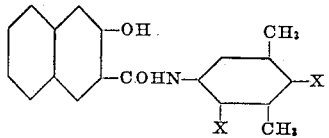

in which X is hydrogen or halogen.

15. The compound represented by the formula:

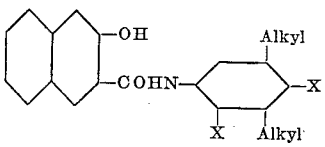

in which X is hydrogen or halogen, and alkyl is saturated and of the formula $C_nH_{2n+1}$.

MILES AUGUSTINUS DAHLEN.
MARTIN EDWIN FRIEDRICH.